Sept. 3, 1957 G. A. MINSHALL 2,804,997
SALT AND PEPPER SHAKERS
Filed Jan. 8, 1954 2 Sheets-Sheet 1
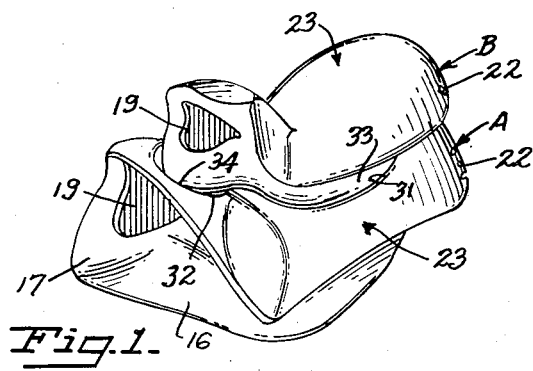
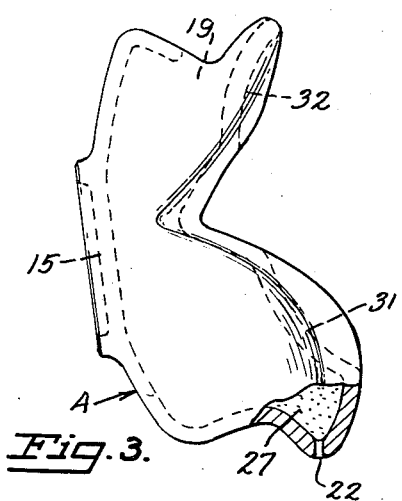
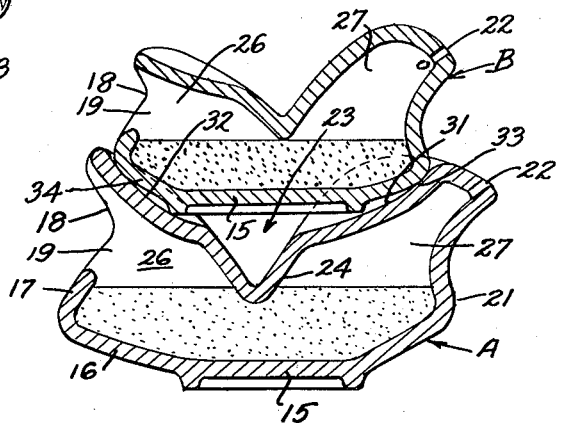
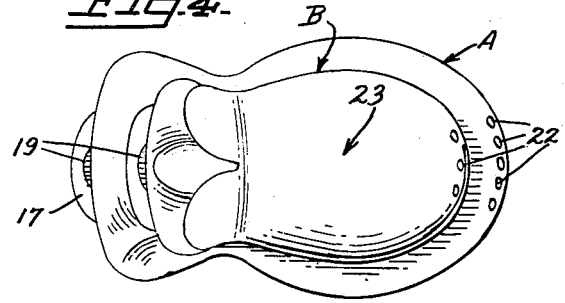
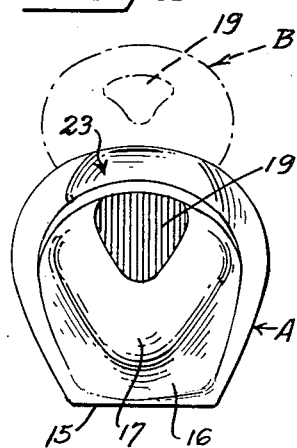
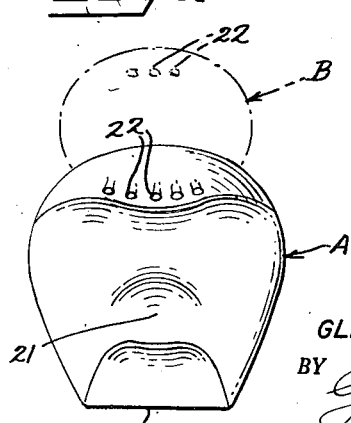
INVENTOR.
GLENN A. MINSHALL
BY George B. White
ATTORNEY Sept. 3, 1957 G. A. MINSHALL 2,804,997
SALT AND PEPPER SHAKERS
Filed Jan. 8, 1954 2 Sheets-Sheet 2
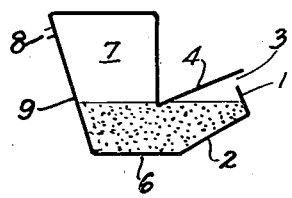
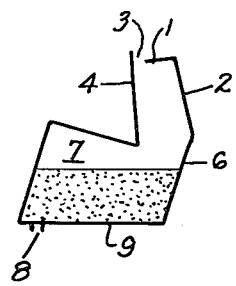
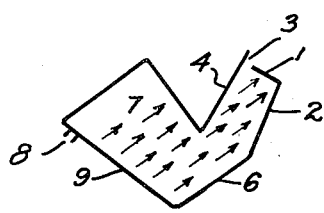
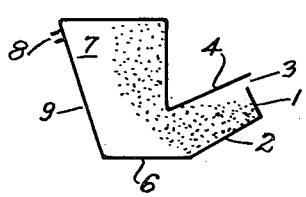
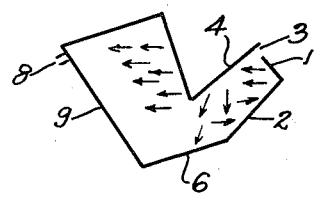
INVENTOR.
GLENN A. MINSHALL
BY *George B White*
ATTORNEY United States Patent Office 2,804,997
Patented Sept. 3, 1957

2,804,997

SALT AND PEPPER SHAKERS

Glenn A. Minshall, Carmel, Calif.

Application January 8, 1954, Serial No. 402,955

7 Claims. (Cl. 222—143)

This invention relates to shaker boxes for a mass of small particles such as salt and pepper shakers.

The primary object of the invention is to provide a shaker box or salt and pepper shakers or the like, which can be filled and used without the need for a stopper.

Another object of the invention is to provide shaker boxes, salt and pepper shakers, or the like, wherein an intake opening is on a tipped up portion or wall of the shaker so located with respect to the dispensing perforations of the shaker that the shaker can be tilted and shaken with the usual shaking motion to dispense the contents through said perforations and the shaking forces so exerted move the particles in the shaker first toward the dispenser perforations and then in opposite direction, yet the particles can not escape through said intake opening.

Another object of the invention is to provide salt and pepper shakers the dispenser ends and intake ends of which are so tilted as to permit manipulation without plugging or covering the intake opening in the intake end, and which also permit the nesting of one shaker on top of the other.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

Fig. 1 is a perspective view of a nested arrangement of a form of my salt and pepper shakers.

Fig. 2 is a vertical sectional view of said nested shakers.

Fig. 3 is a completely tilted view of the shaker in dispensing position.

Fig. 4 is a top plan view of the lower shaker of Fig. 2.

Fig. 5 is an intake end view of the lower shaker showing the upper nested shaker in broken lines.

Fig. 6 is a dispenser end view of the lower shaker, showing the upper nested shaker in broken lines.

Fig. 7 is a diagrammatic view showing the particles within my shaker container in initial position.

Fig. 8 is a diagrammatic view showing the particles in my shaker container in tipped position for dispensing.

Fig. 9 is a diagrammatic view showing the direction of forces on the particles in my container during the up stroke shaking movement.

Fig. 10 is a diagrammatic view showing the particles at the end of the top stroke of the shaking movement.

Fig. 11 is a diagrammatic view showing the direction of forces on the particles at the start of the downward stroke of the shaker.

The herein invention is based on the principle that a material of loose particles, such as salt, pepper or the like, is shifted directionally by back and forth shaking motion and if a baffle wall is provided at a suitable angle with respect to an opening arranged at an angle to the line of the usual shaking, then the particles will not escape through the opening and no lid, plug or stopper is needed for such opening.

For instance, viewing Fig. 7, a baffle wall 1 is provided generally at right angles to a sloping bottom wall 2 and just below the intake opening 3. A sloping top wall 4 extends from the top of the opening 3 downwardly and toward the bottom 6, and is convergent to the sloping bottom wall 2 inwardly of the box or container. A dispensing chamber 7 extends above the bottom 6 and beyond the sloping top 4, which, in the case of salt and pepper shakers particularly, has dispensing perforations or holes 8 near its top on its side farthest from and generally opposite to said intake opening 3.

In such general arrangement the particles of material are poured into the container through the opening 3 to fill said container up to the lower lip of said opening 3. The baffle wall 1 is generally at right angles to the line of direction of back and forth rocking during the shaking motion for shaking the particles out through the dispensing perforations 8.

As shown in Fig. 8 the container is tipped ready for shaking and the particles settle over and on the side opposite the baffle wall 1. Then the container shaking starts on the upward stroke throwing the particles backward toward the baffle wall 1 as shown in Fig. 9, so that ultimately at the top of the upward stroke the particles crowd against the baffle wall 1 and against the chamber wall above the sloping top wall 4, as shown in Fig. 10. During the following downstroke of shaking the particles are thrown generally away from the baffle wall 1 and toward the chamber wall 9 opposite said baffle wall 1 and to the dispensing perforations 8, as shown in Fig. 11. In this manner the container can be shaken vigorously without spilling any of its contents through the offset intake opening 3.

The above described concept is incorporated in the embodiments illustrated in Figs. 1 to 6 inclusive. In this illustrative embodiment I show a salt shaker A and a pepper shaker B adapted to be nested together in accordance with my invention.

The lower shaker A includes a bottom 15 with an inclined or upwardly sloping bottom wall 16 at the end of which is a baffle wall 17 generally at right angles to the sloping wall 16. This baffle wall 17 is a part of the rear end wall 18 of the shaker A which surrounds the intake opening 19 through which the shaker can be filled.

At the other end of the bottom 15 extends upwardly a front end wall 21, near the top of which are provided a series of dispensing perforations or holes 22 nearly in line with the top of the intake opening 18, and preferably above the level thereof.

The top wall 23 of the shaker A inclines generally downwardly toward the bottom 15 from each end thereof so that the lowest middle portion 24 protrudes to or below the level of the intake opening 19 and divides the upper portion of the interior of the shaker into an intake space 26 and a dispensing chamber 27. The portion of the top wall 23 adjacent the intake opening 18 is convergent with the bottom sloping wall 16 inwardly on the container.

The upper shaker B is in general constructed in the same manner as the lower shaker A, except that the upper shaker B is preferably smaller than the lower shaker A. For the purpose of nesting the upper shaker B on top of the lower shaker A, the downwardly inclined parts of the top wall 23 are suitably indented or dished to form recesses 31 and 32 respectively to fit the front and rear bottom slanting portions 33 and 34 respectively of the upper shaker B.

The shakers can be made in various shapes and designs to suit their purpose, but in all forms the arrangement of the intake opening and the baffle below it relatively to the opposite shaking chamber or dispensing chamber, and relatively to the line of directional shaking, result in forces which alternately throw the particles into and out of said chamber and away from or against said baffle without spilling through the intake opening. Thus dispensing through the suitable holes of the chamber wall opposite to said intake opening is facilitated, yet the need for cork, plug or cover for the intake or filler opening is obviated. The intake opening is preferably sufficiently large to permit the insertion of a small spoon or the like for withdrawal of contents, for instance, the use of a salt spoon in salt shakers. An intake baffle arrangement of my invention may be utilized in shakers of various kinds.

It is to be noted further that the relative location of the dispensing holes or perforations determines the general direction or line of back and forth rocking and it is preferable that the intake opening be at an acute angle to said line on which the shaker is rocked or shaken and be offset above said line. It is also desirable that the baffle wall at said intake opening be generally parallel with said line or direction of back and forth shaking motion. It is also preferable that the sloping walls at said baffle and opening define a passage from said opening inclined toward the shaker bottom to function somewhat in the nature of a filling spout. The shaker is to be filled to a level so that the dispensing chamber and the filling spout are normally empty providing space for the capture and return of particles of material during shaking. The sloping portion of the top walls also forms a projection within the shaker to prevent particles shaken toward the dispensing perforations from flying toward the intake opening. The baffle at the intake opening redirects wandering particles into the shaker space. The top wall above the intake opening extends beyond the line of the baffle to shield the opening from above. The above features and many advantages of the shaker herein described renders the same eminently adapted for its purposes.

I claim:

1. In a shaker of the character described, opposite end walls generally in the path of the usual direction of shaking, and a bottom between said end walls, one of said end walls having an intake opening spaced above the bottom, and a top wall partly inclined toward said bottom above said intake opening so as to divide the space in the container substantially above the level of said opening into a shaking chamber and to obstruct particles moving therefrom toward said intake opening.

2. In a shaker of the character described, a bottom, an upwardly sloping bottom wall at one end of said bottom, an end wall generally at right angles to said sloping bottom wall and having an intake opening therethrough facing generally toward said bottom, a top wall portion sloping from the top of said end wall toward said bottom and being convergent with said sloping bottom wall inwardly of the shaker, and a shaking chamber formed above said bottom and beyond said top wall portion, said shaking chamber having dispensing holes generally opposite to and offset with respect to said intake opening.

3. In a shaker of the character described, a bottom, an upwardly sloping bottom wall at one end of said bottom, an end wall generally at right angles to said sloping bottom wall and having an intake opening therethrough facing generally toward said bottom, a shaker chamber formed above said bottom, and a top wall on said shaker converging inwardly from the top of said wall with respect to said sloping bottom wall and then extending over said chamber.

4. In a shaker of the character described, a bottom, an upwardly sloping bottom wall at one end of said bottom, an end wall generally at right angles to said sloping bottom wall and having an intake opening therethrough facing generally toward said bottom, another end wall extending from the other end of said bottom, and sides extended from said bottom to include a container space, a top wall on said shaker, a portion of said top wall sloping inwardly of said space from said first end wall toward said bottom.

5. In a shaker of the character described, a bottom, an upwardly sloping bottom wall at one end of said bottom, an end wall generally at right angles to said sloping bottom wall and having an intake opening therethrough facing generally toward said bottom, another end wall extending from the other end of said bottom, and sides extending from said bottom to include a container space, a top wall sloping from both end walls inwardly toward said bottom, a second shaker and nesting recesses in said top wall adapted to nest the bottom corners of said second shaker.

6. A pair of shakers, each comprising a container having a tipped up intake opening at one end thereof and dispensing holes at its other end, and a top sloping from each end inwardly of said container so as to project between said opening and said holes, nest recesses formed on the sloping portions of the top of each shaker to nest therein the lower portion of the other shaker.

7. A pair of shakers, each comprising a container having a tipped up intake opening at one end thereof and dispensing holes at its other end, and a top sloping from each end inwardly of said container so as to project between said opening and said holes, one shaker being larger than the other shaker, and nest recesses formed on the sloping portions of the top of the larger shaker adapted to nest therein the smaller shaker.

References Cited in the file of this patent

UNITED STATES PATENTS

| | | |
|---|---|---|
| D. 136,081 | Ross | Aug. 3, 1943 |
| 815,883 | Van Blarcom | Mar. 20, 1906 |
| 897,453 | Byam | Sept. 1, 1908 |
| 1,316,106 | Peters | Sept. 16, 1919 |
| 1,416,309 | Tunnicliff | May 16, 1922 |
| 1,921,471 | Langton | Aug. 8, 1933 |
| 2,121,118 | Cooper | June 21, 1943 |
| 2,560,755 | Bendel | July 17, 1951 |